United States Patent
Partridge et al.

(10) Patent No.: US 8,562,825 B2
(45) Date of Patent: Oct. 22, 2013

(54) DEVICE FOR SEPARATING FUEL COMPONENTS

(75) Inventors: Randall D. Partridge, Califon, NJ (US); Kouseki Sugiyama, Numazu (JP)

(73) Assignees: Toyota Jidosha Kabushiki Kaisha, Toyota-shi (JP); Exxon Mobil Research and Engineering Company, Annandale, NJ (US)

( * ) Notice: Subject to any disclaimer, the term of this patent is extended or adjusted under 35 U.S.C. 154(b) by 373 days.

(21) Appl. No.: 12/956,441

(22) Filed: Nov. 30, 2010

(65) Prior Publication Data

US 2012/0132577 A1    May 31, 2012

(51) Int. Cl.
*B01D 35/18* (2006.01)
*C02F 1/02* (2006.01)

(52) U.S. Cl.
USPC ............ 210/180; 210/175; 210/321.6

(58) Field of Classification Search
USPC ........................ 210/175, 180, 321.6
See application file for complete search history.

(56) References Cited

U.S. PATENT DOCUMENTS

| 6,711,893 B2 | 3/2004 | Ueda et al. |
| 2004/0149644 A1 | 8/2004 | Partridge et al. |

FOREIGN PATENT DOCUMENTS

| JP | 2004232624 A | 8/2004 |
| JP | 2007278298 A | 10/2007 |
| JP | 2008510102 A | 4/2008 |
| WO | WO-2006023313 A2 | 3/2006 |

*Primary Examiner* — Dirk Bass
(74) *Attorney, Agent, or Firm* — Gifford, Krass, Sprinkle, Anderson & Citkowski, P.C.

(57) ABSTRACT

A device for separating fuel components comprises a separating membrane for separating high-octane fuel components from un-separated fuel, a heater for heating the un-separated fuel and a pressure apparatus for pressurizing the un-separated fuel. In the device, un-separated fuel is heated by the heater and is pressurized by the pressure apparatus such that the state of the un-separated fuel is changed to a mixed gas phase and liquid phase state of a gas weight ratio from 50% to 95% before coming into contact with the separating membrane.

3 Claims, 1 Drawing Sheet

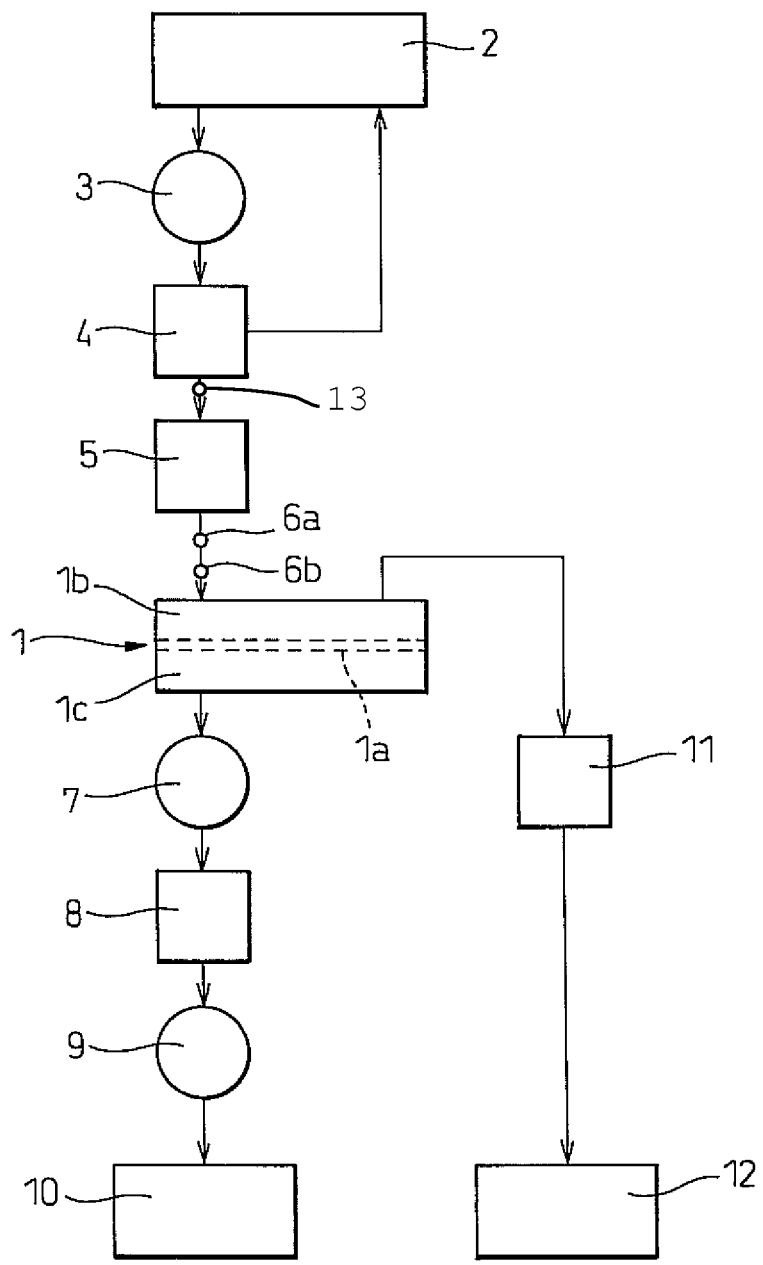

DEVICE FOR SEPARATING FUEL COMPONENTS

BACKGROUND OF THE INVENTION

1. Field of the Invention

The present invention relates to a device for separating fuel components.

2. Description of the Related Art

For example, in an engine having a high compression ratio, high-octane fuel is needed to restrain knocking. However, in low engine load operations in which knocking rarely occurs, the engine may not be required to use high-octane fuel, but low-octane fuel. Accordingly, it is suggested that the engine not use high-octane fuel (high-octane gasoline) which is expensive, but regular gasoline which is separated into high-octane fuel components and the remaining fuel as low-octane fuel by a device for separating fuel components.

The device for separating fuel components separates aromatic components as high-octane fuel components from fuel by means of a separating membrane and makes the remaining fuel low-octane fuel. In such a device for separating fuel components, it is suggested that un-separated fuel be heated to improve a separating ability of the separating membrane (for example, refer to Japanese Unexamined Patent Publication Nos. 2004-232624, 2007-278298 and 2008-510102).

In the device for separating fuel components as the above-mentioned, the un-separated fuel is merely heated. Therefore, there is room to provide further improvement of the separating ability of the separating membrane.

SUMMARY OF THE INVENTION

Accordingly, an object of the present invention is to provide a device for separating fuel components, which can separate high-octane fuel components by means of the separating membrane to provide further improvement of the separating ability of the separating membrane.

A first device for separating fuel components according to the present invention is characterized in that the first device comprises a separating membrane for separating high-octane fuel components from un-separated fuel, a heater for heating the un-separated fuel and a pressure apparatus for pressurizing the un-separated fuel, wherein the un-separated fuel is heated by the heater and is pressurized by the pressure apparatus such that the state of the un-separated fuel is changed to a mixed gas phase and liquid phase state of a gas weight ratio from 50% to 95% before being contact with the separating membrane.

A second device for separating fuel components according to the present invention is characterized in that according to the first device, the gas weight ratio of the un-separated fuel is estimated on the basis of the temperature of the heated un-separated fuel and the pressure of the pressurized un-separated fuel.

A third device for separating fuel components according to the present invention is characterized in that according to the second device, an amount of heat applied by the heater is estimated on the basis of the estimated gas weight ratio of the un-separated fuel and a difference temperature of the un-separated fuel between before and after the heater has heated the un-separated fuel, and it is determined that the current un-separated fuel has a molecular weight heavier than that of normal fuel when the estimated amount of heat applied by the heater is larger than an actual amount of heat applied by the heater.

A fourth device for separating fuel components according to the present invention is characterized in that according to the third device, it is determined if the un-separated fuel has a molecular weight heavier than that of normal fuel when fuel has been supplied to an un-separated fuel tank.

A fifth device for separating fuel components according to the present invention is characterized in that according to one of the above devices, the temperature of the un-separated fuel of the mixed gas phase and liquid phase state is controlled at a temperature from 393 degrees K (120 degrees C.) to 453 degrees K (180 degrees C.) by the heater.

According to the first device for separating fuel components of the present invention, the first device comprises the separating membrane for separating high-octane fuel components from un-separated fuel, a heater for heating the un-separated fuel and a pressure apparatus for pressurizing the un-separated fuel. In the first device, the un-separated fuel is heated by the heater and is pressurized by the pressure apparatus such that the state of the un-separated fuel is changed to a mixed gas phase and liquid phase state of a gas weight ratio from 50% to 95% before being in contact with the separating membrane. Therefore, the high-octane fuel components having high boiling points can vaporize so as to easily permeate the separating membrane. Accordingly, in comparison with the case that heated un-separated fuel is contact with the separating membrane in a liquid phase, the separating ability of the separating membrane in the first device can be considerably improved.

According to the second device for separating fuel components of the present invention, in the first device, the gas weight ratio can be easily estimated on the basis of the temperature of the heated un-separated fuel and the pressure of the pressurized un-separated fuel.

According to the third device for separating fuel components of the present invention, in the second device, an amount of heat applied by the heater is estimated on the basis of the estimated gas weight ratio and a difference temperature of the un-separated fuel between before and after the heater heats the un-separated fuel, and when the estimated amount of heat applied by the heater is larger than an actual amount of heat applied by the heater, the estimated amount of heat applied by the heater includes an amount of latent heat of un-vaporized fuel and the un-separated fuel vaporizes at a gas weight ratio lower than the estimated gas weight ratio. Thus, at this time, it can be determined that the current un-separated fuel has a molecular weight heavier than that of normal fuel.

According to the fourth device for separating fuel components of the present invention, in the third device, the property of the un-separated fuel can change every fuel supply and therefore it is determined if the un-separated fuel has a molecular weight heavier than that of normal fuel when fuel has been supplied to an un-separated fuel tank.

According to the fifth device for separating fuel components of the present invention, in one of the above devices, the temperature of the un-separated fuel of the mixed gas phase and liquid phase state is controlled at a temperature from 393 degrees K (120 degrees C.) to 453 degrees K (180 degrees C.) by the heater and therefore the high-octane fuel components having high boiling points are promoted to vaporize and it is rare that the un-separated fuel deteriorates by excessive heating.

BRIEF DESCRIPTION OF THE DRAWINGS

FIG. 1 is a schematic vertical sectional view showing a device for separating fuel components according to the present invention.

DESCRIPTION OF THE PREFERRED EMBODIMENT

FIG. 1 is a schematic vertical sectional view showing a device for separating fuel components according to the present invention. In FIG. 1, reference numeral 1 designates a station for separating the fuel components comprising a first section 1b and a second section 1c which are divided by a separating membrane 1a permeating aromatic components. The separating membrane 1a is selectively permeable to aromatic components in the fuel. Reference numeral 2 is an un-separated fuel tank for storing the un-separated fuel. Reference numeral 3 is a pressure apparatus, namely a fuel pump for pressurizing the fuel of the un-separated fuel tank 2 and supplying the pressurized fuel to the first section 1b of the station 1. Reference numeral 4 is a regulator for regulating a flow rate of the un-separated fuel supplied to the first section 1b of the station 1. Reference numeral 5 is a heater for heating the pressurized un-separated fuel immediately before being supplied to the first section 1b.

The heater 5 is an electric heater. However, the heater 5 may utilizes the heat of the exhaust gas. Reference numeral 13 is a first temperature sensor for measuring a first temperature of the un-separated fuel immediately upstream of the heater 5. Reference numeral 6a is a second temperature sensor for measuring a second temperature of the fuel heated by the heater 5 immediately upstream of the first section 1b. Reference numeral 6b is a pressure sensor for measuring a pressure of the fuel pressurized by the pressure apparatus 3 immediately upstream of the first section 1b.

Thus, when the pressurized un-separated fuel is supplied to the first section 1b and pressure within the second section 1c is maintained at a relatively low pressure, aromatic components of the un-separated fuel in the first section 1b permeate the separating membrane 1a, and exude on the surface of the separating membrane 1a at the second section 1c side. In the present embodiment, a pressure within the second section 1c is maintained at a pressure lower than the saturated vapor pressure of the exuded aromatic components and thus the fuel exuded on the surface of the membrane can be vaporized continuously from the surface of the membrane. The vaporized fuel is sent to a gas and liquid separator 8 by a vacuum pump 7 and then the high-octane fuel condensed in the gas and liquid separator 8 is supplied to a high-octane fuel tank 10 by a fuel pump 9.

On the other hand, low-octane fuel remaining when aromatic components permeate the separating membrane 1a has an octane number lower than that of the un-separated fuel. Because the low-octane fuel has a relatively high pressure, the low-octane fuel liquefies when the low-octane fuel passes through the regulator 11 and the liquid low-octane fuel flows into a low-octane fuel tank 12 by itself. Thus, in the present embodiment, a pump for supplying the low-octane fuel to the low-octane fuel tank 12 can be omitted. If necessary, the high-octane fuel is cooled down by an air cooling apparatus and a heat exchanger between the high-octane fuel and the un-separated fuel before being supplied to the high-octane fuel tank 10. If necessary, the low-octane fuel is cooled down by an air cooling apparatus and a heat exchanger between the low-octane fuel and the un-separated fuel before being supplied to the low-octane fuel tank 12. All of the above mentioned members are mounted on the vehicle.

The high-octane fuel stored in the high-octane fuel tank 10 is sent to for example a delivery pipe, and is then injected from the delivery pipe via a fuel injector arranged in the intake port of each cylinder mainly in high engine load operations so as to be supplied to the cylinder from the intake port. On the other hand, the low-octane fuel stored in the low-octane fuel tank 12 is sent to, for example, another delivery pipe, and is then injected from this delivery pipe via a fuel injector arranged in each cylinder mainly in low engine load operations so as to be supplied to the cylinder directly.

Thus, in the engine having a high compression ratio, regular gasoline which has a lower price may be used. In low engine load operations in which knocking rarely occurs, the low-octane fuel separated from the regular gasoline can be mainly used via the fuel injector arranged in the cylinder. On the other hand, in the high engine load operations in which knocking readily occurs, the high-octane fuel separated from the regular gasoline can be mainly used via the fuel injector arranged in the intake port and therefore good operations without knocking can be realized.

In the present embodiment, to improve a separating ability of the separating membrane 1a, the un-separated fuel is heated by the heater 5 and is pressurized by the pressure apparatus 3 such that the state of the un-separated fuel is changed to a mixed gas phase and liquid phase state of a gas weight ratio from 50% to 95% before being contact with the separating membrane 1a. When the un-separated fuel is heated and the heated un-separated fuel is in contact with the separating membrane in an liquid phase, the high-octane fuel components having a low boiling point easily permeate the separating membrane, but the high-octane fuel components having high a boiling point do not easily permeate the separating membrane. However, in the present embodiment, a gas weight ratio (a ratio a weight of gas to a weight of gas and liquid) of the un-separated fuel is made from 50% to 95% and therefore a part of the high-octane fuel having the high boiling point vaporizes to easily permeate the separating membrane 1a. Accordingly, the separating ability of the separating membrane 1a can be considerably improved. However, if a gas weight ratio of the un-separated fuel is made 100% and all of the un-separated fuel vaporizes, the separating membrane 1a is easily damaged. Therefore, at least part of the un-separated fuel (5%) is maintained in a liquid phase.

In normal fuel, a gas weight ratio R can be easily estimated by the following expression (1).

$$R=(0.0154*T)+(1*((-0.00191*P)-0.7473)) \quad (1)$$

Here, T (degrees C.) is a temperature of the un-separated fuel after heating of the heater 5, and can be measured by the temperature sensor 6a. P (kPa) is a pressure of the un-separated fuel after pressurizing of the pressure apparatus 3 and can be measured by the pressure sensor 6b.

On the other hand, an amount of heat Q1 (W) applied by the heater 5, except that the latent heat of vaporization can be expressed by a following expression (2).

$$Q1=m*Cp*\Delta T=U*A*\Delta T \quad (2)$$

Here, m (g/sec) is a flow rate of the un-separated fuel passing through the heater 5 which is regulated by the regulator 4. Cp (J/g degrees C.) is a specific heat of the un-separated fuel. ΔT (degrees C.) is a difference temperature of the un-separated fuel between before and after the heater 5 heats the un-separated fuel, namely a difference (T-T') between the second temperature (T) of the un-separated fuel after heating of the heater 5 and the first temperature (T') of the un-separated fuel before heating of the heater 5. U (J/sec m² degrees C.) is a heat transfer coefficient. A (m²) is a heat transfer area. If the first temperature sensor 13 is arranged immediately upstream of the heater 5, the first temperature (T') of the un-separated fuel before heating of the heater 5 can be measured by the first temperature sensor.

An amount of latent heat Q2 (W) to vaporize the liquid un-separated fuel in the heater 5 vaporizes is expressed by a following expression (3).

$$Q2 = m*Hv*R \quad (3)$$

Here, Hv is a coefficient. A gas weight ratio R can be estimated by the expression (1).

Thus, a total of the amount of heat Q1 applied by the heater 5 except the latent heat of vaporization estimated on the basis of the difference temperature ΔT of the un-separated fuel between before and after the heater 5 heats the un-separated fuel and the amount of latent heat Q2 on the basis of the gas weight ratio R estimated by the expression (1) is an estimated amount of heat Q (Q1+Q2) applied by the heater 5. When this estimated amount of heat Q applied by the heater 5 is larger than an actual amount of heat Q' applied by the heater 5, the estimated amount of heat Q applied by the heater 5 includes an amount of latent heat of un-vaporized fuel and the un-separated fuel vaporizes at a gas weight ratio lower than the estimated gas weight ratio R. Therefore, it can be determined that the current un-separated fuel is more difficult to vaporize than normal fuel and has a molecular weight heavier than that of the usual fuel.

When the fuel in the un-separated fuel tank 2 has a molecular weight heavier than that of the usual fuel, the gas weight ratio R estimated by the expression (1) is larger than the actual gas weight ratio. To realize a desired gas weight ratio, an amount of heat applied by the heater 5 may be increased or a pressure applied by the pressure apparatus 3 may be decreased, or an amount of heat applied by the heater 5 may be increased and a pressure applied by the pressure apparatus 3 may be decreased at the same time.

The property of the fuel in the un-separated fuel tank 2 changes every fuel supply when fuel of the same property is not supplied. Accordingly, it is preferable to determine if the un-separated fuel is heavy molecular weight fuel every when fuel is supplied to the un-separated fuel tank.

In the present embodiment, the heater 5 makes the temperature of the un-separated fuel be equal to or higher than 393 degrees K (120 degrees C.) at which the high-octane fuel having the high boiling point is promoted to vaporize, and the temperature of the un-separated fuel be not above 453 degrees C. (180 degrees C.) at which the un-separated fuel deteriorates by excessive heating. The pressure apparatus 3 pressurizes the un-separated fuel heated by the heater 5 (for example, at a pressure from 101 kPa to 600 kPa) such that the gas weight ratio of the un-separated fuel R becomes from 50% to 95% before being contact with the separating membrane 1a.

For example, when the heater 5 makes the temperature of the un-separated fuel at a specific flow rate be 413 degrees K (140 degrees C.), the gas weight ratio R of the un-separated fuel becomes 74%. At this time, an amount of heat applied by the heater 5 when the temperature T' of the un-separated fuel before heating of the heater 5 is 393 degrees K (120 degrees C.) is 378 W, an amount of heat applied by the heater 5 when the temperature T' of the un-separated fuel before heating of the heater 5 is 373 degrees K (100 degrees C.) is 432 W, an amount of heat applied by the heater 5 when the temperature T' of the un-separated fuel before heating of the heater 5 is 353 degrees K (80 degrees C.) is 486 W, an amount of heat applied by the heater 5 when the temperature T' of the un-separated fuel before heating of the heater 5 is 333 degrees K (60 degrees C.) is 540 W, an amount of heat applied by the heater 5 when the temperature T' of the un-separated fuel before heating of the heater 5 is 313 degrees K (40 degrees C.) is 594 W, an amount of heat applied by the heater 5 when the temperature T' of the un-separated fuel before heating of the heater 5 is 293 degrees K (20 degrees C.) is 648 W, and an amount of heat applied by the heater 5 when the temperature T' of the un-separated fuel before heating of the heater 5 is 273 degrees K (0 degrees C.) is 702 W.

The invention claimed is:

1. A device for separating fuel components comprising:
   a separating membrane that separates high-octane fuel components from un-separated fuel;
   a heater that heats said un-separated fuel;
   a first temperature sensor positioned upstream from said heater, the first temperature sensor detects a first temperature of said un-separated fuel;
   a second temperature sensor positioned downstream from said heater, the second temperature sensor detects a second temperature of said un-separated fuel after being heated by the heater; and
   a pressure apparatus that pressurizes said un-separated fuel;
   wherein said un-separated fuel is heated by said heater and said un-separated fuel is pressurized by said pressure apparatus such that a state of said un-separated fuel is changed to a mixed gas phase and liquid phase state of a gas weight ratio from 50% to 95% before coming into contact with said separating membrane, said gas weight ratio of said un-separated fuel is estimated on the basis of said second temperature of said un-separated fuel detected by said second temperature sensor and a pressure of said pressurized un-separated fuel;
   wherein an amount of heat applied by said heater is estimated on the basis of said estimated gas weight ratio of said un-separated fuel and a difference between said second temperature after said heater and said first temperature before said heater, and it is determined that the current un-separated fuel has a molecular weight heavier than that of a normal fuel when the estimated amount of heat applied by said heater is larger than an actual amount of heat applied by said heater.

2. The device for separating fuel components according to claim 1, wherein it is determined if said un-separated fuel has a molecular weight heavier than that of normal fuel when fuel has been supplied to an un-separated fuel tank.

3. The device for separating fuel components according to claim 1, wherein said second temperature of said un-separated fuel of the mixed gas phase and liquid phase state is controlled at a temperature from 393 degrees K (120 degrees C.) to 453 degrees K (180 degrees C.) by said heater.

* * * * *